US007214316B2

(12) United States Patent
Albright

(10) Patent No.: US 7,214,316 B2
(45) Date of Patent: May 8, 2007

(54) APPARATUS CONTAINING PHOSPHATE SELECTIVE RESIN

(76) Inventor: Robert L. Albright, 36 Autumn Rd., Southampton, PA (US) 18966-1011

( * ) Notice: Subject to any disclaimer, the term of this patent is extended or adjusted under 35 U.S.C. 154(b) by 0 days.

(21) Appl. No.: 11/333,461
(22) Filed: Jan. 17, 2006

(65) Prior Publication Data

US 2006/0116485 A1 Jun. 1, 2006

Related U.S. Application Data

(63) Continuation-in-part of application No. 10/928,565, filed on Sep. 30, 2004, now Pat. No. 7,019,085.

(51) Int. Cl.
*B01D 39/16* (2006.01)
*B01D 39/04* (2006.01)

(52) U.S. Cl. ............................ 210/502.1; 210/500.25; 210/500.34; 210/321.75; 210/321.8; 210/321.84; 210/321.89; 525/386; 525/340; 525/360

(58) Field of Classification Search ............ 210/502.1, 210/500.25, 500.34, 321.75, 321.8, 321.84, 210/321.89; 525/386, 340, 360
See application file for complete search history.

(56) References Cited

U.S. PATENT DOCUMENTS 4,247,393 A * 1/1981 Wallace ...................... 210/638

* cited by examiner

*Primary Examiner*—Ling-Sui Choi

(74) *Attorney, Agent, or Firm*—Dan De La Rosa

(57) ABSTRACT

An apparatus containing crosslinked polymer for binding phosphate anions is provided, the polymer comprises a polyvalent cation attached to the polymer through at least one covalently bound anionic functional group, and wherein the anionic group is selected from a group consisting of sulfonate, carboxylate, phosphonate and mixtures thereof and wherein the cation is selected from a group consisting of aluminum, calcium, magnesium, molybdenum, manganese, titanium, barium, strontium, zirconium, vanadium, scandium, lanthanum, yttrium, cerium, nickel, iron, copper, cobalt, chromium, zinc and mixtures thereof.

20 Claims, No Drawings

APPARATUS CONTAINING PHOSPHATE SELECTIVE RESIN

RELATED APPLICATION

This application is a continuation-in-part of U.S. application Ser. No. 10/928,565, entitled "PHOSPHATE SELECTIVE RESIN AND RELATED METHODS", filed on Aug. 30, 2004 and now U.S. Pat. No. 7,019,085.

BACKGROUND OF THE INVENTION

1. Field of the Invention

The present invention relates to an apparatus containing phosphate selective resin and more specifically, a cartridge containing hemocompatible polymeric resin functionalized to remove phosphate anions from whole blood without appreciably effecting the concentration of the other major anions of chloride and bicarbonate. The polymeric resin is targeted for extracorporal application in conjunction with hemodialysis. The functioning binding agent for the phosphate is a polyvalent cation attached to the polymer via an anionic group.

2. Description of Related Art

People with functioning kidneys have normal phosphate levels in their blood of 2.5 to 4.5 mg/dl of blood (measured as phosphorus), so that the phosphate anion concentration calculated as a millimole of $HPO_4^{2-}$ anion ranges within 0.081 to 0.145 mmole per dl (deciliter). At the pH of blood ranging from 7.35 to 7.45, the predominant monomeric phosphate anion is the monohydrogenphosphate anion, $HPO_4^{2-}$. The phosphate anion level is held in this narrow concentration range for a healthy homeostasis by the normal functioning kidney via a check and balance system that involves hormones and reabsorption of water and electrolyte (ions) in the tubules of the kidney.

People with End Stage Renal Function or Disease are not able to keep the phosphate level in the blood within the proper normal range when eating a normal protein diet. Phosphate enters the body primarily through ingested protein. The phosphate level rises out of control with such individuals reaching blood levels as high as four times (4×) the normal blood concentration. This condition, known as hyperphosphateria, if untreated allows calcium to be pulled from the bone mass producing degenerative bone disease.

For people with End Stage Renal Disease (ESRD), the phosphate concentration in the blood is regulated by either a low protein diet or by ingesting phosphate binders with the food intake. The phosphate anions from the ingested protein are trapped by the binder or sequestrant and are carried out with the feces with only a very small amount of absorption into the blood from the intestinal tract. The phosphate binders initially used were aluminum and calcium compounds, but these were found to have moderately severe to very severe side effects. More recently (1997–2004), phosphate binding agents have been developed that are anion exchange polymers (RenaGel® and a polymer bound guanidinium hydrochloride) and less toxic inorganic compounds such as lanthanum carbonate tetrahydrate (Fosrenal™), ferric salts of citrate and acetate, and a lanthanum based porous ceramic material (RenaZorb™). All of these phosphate-binding agents are ingested with food and are designed to sequester phosphate anions during the digestive process in the intestinal tract. The absorption through the intestinal wall into the blood by the bound or sequestered phosphate is hindered and, consequently, the phosphate is carried out by way of the feces.

This invention defines polymeric sequestrants for phosphate anions that are not ingested with food at mealtime. They function by binding phosphate anions directly from the blood as part of the hemodialysis system during the treatment sessions for people with End Stage Renal Disease (ESRD). These polymers function as selective sequestrants for the divalent monohydrogenphosphate anion and the anions of polyphosphoric acids without disturbing the concentrations of the other major anions of chloride and bicarbonate. Since bicarbonate is not bound by these sequestrants, the pH of the blood is unaltered during the treatment session.

SUMMARY OF THE INVENTION

The present invention relates to an apparatus containing crosslinked polymers for binding phosphate anions, and the polymers comprise at least one polyvalent cation bound to the polymers wherein the cation in each of the polymers functions as the binding site for phosphate anions to thereby capture phosphate anions.

In another embodiment, the apparatus comprises a cartridge. In still another embodiment, the apparatus has the capacity of holding at least 200 ml of the phosphate selective polymers. In yet another embodiment, the apparatus has the capacity of holding from about 200 ml to about 500 ml of the phosphate selective polymers.

In still yet another embodiment, the apparatus has an inlet, an outlet and a cylindrical geometry and a dimension of at least 10 cm in diameter and at least 4 cm in length with the capacity of holding at least 300 ml of polymer bead bed volume.

In a further embodiment, the present invention provides for a cylindrical containment device for housing crosslinked polymers for binding phosphate anions, each of the polymers comprises a polyvalent cation attached to each of the polymers through at least one covalently bound anionic functional group wherein the cation functions as the binding site for phosphate anions to thereby capture the phosphate anions.

In still a further embodiment, the device has an inlet; an outlet; and a dimension of at least 10 cm in diameter and at least 10 cm in length with the capacity of holding at least 500 ml of polymer bead bed volume. In yet a further embodiment, the device has the capacity of holding at least 200 ml of the phosphate selective polymers.

In another further embodiment, the present invention provides for a containment device for housing polymers for removing phosphate anions from a human bodily fluid environment, the polymers being manufactured by a method comprising: forming crosslinked polymers, attaching at least one anionic group to each of the polymers, and binding at least one polyvalent cation onto the anionic group attached to the polymers wherein the cation functions as the binding site for phosphate anions to thereby capture the phosphate anions. In another embodiment, the phosphate selective polymers are inserted into the device.

The present invention provides for a crosslinked polymer for binding phosphate anions wherein the polymer comprises at least one polyvalent cation wherein the cation functions as the binding site for phosphate anions. In another embodiment, the polymer is selected from a group consisting of divinylbenzene, styrene, ethylvinylbenzene, acrylic acid, methacrylic acid, esters of acrylic acid, esters of methacrylic acid, maleic acid and esters thereof, itaconic acid and esters thereof, trimethylolpropane trimethacrylate, trimethylolpropane triacrylate, and mixtures thereof.

In still another embodiment, the cation is attached to the polymer through at least one anionic group and the anionic group is selected from a group consisting of sulfonate, carboxylate, phosphonate and mixtures thereof. In yet another embodiment, the cation is selected from a group consisting of aluminum, calcium, magnesium, molybdenum, manganese, titanium, barium, strontium, zirconium, vanadium, scandium, lanthanum, yttrium, cerium, nickel, iron, copper, cobalt, chromium, zinc and mixtures thereof. In still yet another embodiment, the polymer is a hemocompatible polymer. For purposes of this invention, the term "hemocompatible" is defined as a condition whereby a material, when placed in contact with whole blood and blood components or physiological fluids, results in clinically acceptable physiological changes. In a further embodiment, the polymer is a biocompatible polymer. For purposes of the invention, the term "biocompatible" is defined as being able to coexist with body fluids—whole blood, blood plasma, and lymph fluid—without initiating an adverse physiologic change within the fluid or at the polymer surface interfacing with the fluid.

The polymer of the present invention can be porous, non-porous or microporous. The term "porous polymer" is defined as a polymer particle having an internal pore structure with a porosity resulting from voids or holes throughout the polymer matrix. The term "non-porous polymer" is defined as an amorphous, gellular material without pores. The term "microporous polymer" is synonymous with non-porous polymer. In still another embodiment, the polymer is an ion exchange resin or polymer. An ion exchange resin or polymer is a resin or polymer carrying ionogenic groups that are capable of exchanging ions or of sequestering ions. The ion exchange polymers of the present invention are beneficial when used with blood for removing and isolating varying ions and ionogenic molecules.

In still a further embodiment, the polymer binds to phosphate anions in a human bodily fluid environment, wherein the human bodily fluid environment is selected from a group consisting of whole blood, lymph fluid, blood plasma and mixtures thereof.

In yet a further embodiment, the present invention relates to a crosslinked polymer for binding phosphate anions, the polymer comprising a polyvalent cation attached to the polymer through at least one covalently bound anionic functional group. In still yet a further embodiment, the polymer is selected from a group consisting of divinylbenzene, styrene, ethylvinylbenzene, acrylic acid, methacrylic acid, esters of acrylic acid, esters of methacrylic acid, maleic acid and esters thereof, itaconic acid and esters thereof, trimethylolpropane trimethacrylate, trimethylolpropane triacrylate, and mixtures thereof. In another further embodiment, the anionic functional group is selected from a group consisting of sulfonate, carboxylate, phosphonate and mixtures thereof. In still another further embodiment, the cation is selected from a group consisting of aluminum, calcium, magnesium, molybdenum, manganese, titanium, barium, strontium, zirconium, vanadium, scandium, lanthanum, yttrium, cerium, nickel, iron, copper, cobalt, chromium, zinc and mixtures thereof.

In another embodiment, the present invention provides a polymer for removing phosphate anions from a human bodily fluid environment, the polymer being manufactured by a method comprising: forming a crosslinked polymer, attaching at least one anionic group to the polymer, and binding at least one polyvalent cation onto the anionic group attached to the polymer.

In a further embodiment, the present invention relates to a method of manufacturing a polymer for binding phosphate anions, the method comprising: forming a crosslinked polymer, covalently attaching at least one anionic group to the polymer, and binding at least one polyvalent cation onto the anionic group attached to the polymer to form a ligand whereby the ligand is design to remove phosphate anions to thereby capture said phosphate anions.

DETAILED DESCRIPTION OF THE INVENTION

As required, detailed embodiments of the present invention are disclosed herein; however, it is to be understood that the disclosed embodiments are merely exemplary of the invention that may be embodied in various forms. Therefore, specific functional details disclosed herein are not to be interpreted as limiting, but merely as a basis for the claims and as a representative basis for teaching one skilled in the art to employ the present invention in various ways.

The specific examples below will enable the invention to be better understood. However, they are given merely by way of guidance and do not imply any limitation.

The polymers are prepared in spherical bead geometry by suspension polymerization of the monomers in a formulated aqueous phase. The aqueous phase is formulated to provide droplet stability by a polymeric dispersant, to quench aqueous phase polymerization by a water-soluble free radical inhibitor and, where needed, a buffer to maintain a pH above nine (9.0) during the conversion of the monomer droplets into a suspension of polymer beads.

The polymers are prepared from both aromatic monomers and aliphatic monomers with crosslinking provided by divinylbenzene (DVB) and trimethylolpropane trimethacrylate (TMPTMA). The initiator most used is benzoyl peroxide, although the azo-and peroxydicarbonate-initiators may also be used. The polymers in the attached examples are non-porous gel polymers, although porous polymers may also be prepared and used as the anchoring substrate for the functionality, provided the maximum pore diameter is kept under 100 Å so as to exclude protein sorption during direct contact with whole blood.

With benzoyl peroxide as the initiator, the polymerizations are carried out at 70 to 75° C. for five (5) to eight (8) hours followed by a temperature ramp to 95° C. for an additional two (2) hours to decompose unreacted benzoyl peroxide.

The active group that sorbs the phosphate anions from the blood is any one of the polyvalent cations (listed in Table 1 below) attached to the polymeric matrix via covalenty bound anionic groups. The anionic groups most used in this invention are sulfonate and carboxylate. The sulfonate group is covalently bound to the crosslinked aromatic polymer by sulfonation at 80 to 100° C. for four hours with 96 to 99% sulfuric acid. The aromatic polymers are terpolymers of styrene, ethylvinylbenzene (EVB) and varying levels of divinylbenzene (DVB). The divinylbenzene is the crosslinking agent that provides the insolubility to the sulfonated aromatic bead polymers.

The spherical carboxylate polymers are prepared by suspension polymerization of acrylate and methacrylate esters in the presence of 3 to 5 wt. % sodium sulfate with crosslinking provided by either divinylbenzene or trimethylolpropane trimethacrylate. The ester group is transformed into the carboxylate anion by caustic hydrolysis with 5 wt. % sodium hydroxide, with the methyl esters being the easiest to hydrolyze.

The polyvalent cations are loaded onto the polymer bound anionic groups via an ion exchange procedure. The functionalized bead polymers are loaded into a glass column to give a bead bed aspect ratio (bed height/bed diameter) of 10 to 12. The bead bed is treated downflow with a 3 to 5 wt. % aqueous solution of the nitrate salt of the polyvalent cation at a flow rate of 2 to 4 bed volumes per hour until the effluent exiting the bottom of the column has the composition of the influent entering the top of the column. At this point all the counter ions initially associated with the anionic groups bound to the polymeric matrix have been displace by the polyvalent cation.

The polyvalent cations that are effective for binding phosphate anions selectively from whole blood are identified in the attached tabulation set forth below in Table 1:

TABLE 1

Polyvalent Cations to be anchored to the Polymers

| Cation | Available Salt | Solubility | MW |
|---|---|---|---|
| $Al^{3+}$ | $Al(NO_3)_3$•$9H_2O$ | 67.3 g/100 ml $H_2O$ | 375.134 |
| $Ca^{2+}$ | $Ca(NO_3)_2$•$4H_2O$ | 129 g/100 g $H_2O$ | 236.149 |
| $Mg^{2+}$ | $Mg(NO_3)_2$•$6H_2O$ | Soluble in 0.8 parts $H_2O$ | 256.406 |
| $Mn^{2+}$ | $Mn(NO_3)_2$•$4H_2O$ | Very Soluble in $H_2O$ | 251.010 |
| $Ti^{4+}$ | $TiCl_4$ | Soluble in cold $H_2O$ | 189.678 |
| $Ba^{2+}$ | $Ba(NO_3)_2$ | 9.27 g/100 g $H_2O$ | 261.336 |
| $Sr^{2+}$ | $Sr(NO_3)_2$ | 40.7 g/100 g $H_2O$ | 211.629 |
| $Zr^{4+}$ | $Zr(NO_3)_4$•$5H_2O$ | Very Soluble in $H_2O$ | 429.320 |
| $V^{3+}$ | $VCl_3$ | Decomposes in $H_2O$ | 157.300 |
| $Sc^{3+}$ | $Sc(NO_3)_3$•$5H_2O$ | Very Soluble in $H_2O$ | 321.047 |
| $La^{3+}$ | $La(NO_3)_3$•$6H_2O$ | 136 g/100 g $H_2O$ | 433.012 |
| $Y^{3+}$ | $YCL_3$ | 78.8 g/100 g $H_2O$ | 195.264 |
| $Y^{3+}$ | $Y(NO_3)_3$•$6H_2O$ | 123 g/100 g $H_2O$ | 383.012 |
| $Y^{3+}$ | $YCl_3$•$6H_2O$ | 235 g/100 ml $H_2O$ | 303.355 |
| $Ce^{3+}$ | $Ce(NO_3)_3$•$6H_2O$ | Soluble in $H_2O$ | 434.221 |
| $Ni^{2+}$ | $Ni(NO_3)_2$•$6H_2O$ | Soluble in 0.4 parts $H_2O$ | 290.794 |
| $Fe^{3+}$ | $Fe(NO_3)_3$•$9H_2O$ | 137.7 g/100 g $H_2O$ | 403.997 |
| $Cu^{2+}$ | $Cu(NO_3)_2$•$3H_2O$ | 137.8 g/100 g $H_2O$ | 241.602 |
| $Co^{3+}$ | $Co(NO_3)_3$ | Soluble in $H_2O$ | 244.948 |
| $Co^{2+}$ | $Co(NO_3)_2$•$6H_2O$ | 133.8 g/100 ml $H_2O$ | 291.034 |
| $Cr^{3+}$ | $Cr(NO_3)_3$•$9H_2O$ | 74% $H_2O$ | 400.148 |
| $Zn^{2+}$ | $Zn(NO_3)_2$•$6H_2O$ | 56.1 g/100 g $H_2O$ | 297.491 |
| $Cr^{3+}$ | $CrCl_3$•$6H_2O$ | Soluble in $H_2O$ | 266.445 |

The dispersion mixture for a five (5) liter reactor for preparing the aromatic polymers is set forth below in Table 2:

TABLE 2

Dispersion Mixture For Five (5) Liter Reactor For Preparing Aromatic Polymers

| | | |
|---|---|---|
| Aq/Org. Vol. Ratio | 1.1 | |
| Volume of Organic Phase | 1900 | ml |
| Volume of Aqueous Phase | 2090 | ml |
| Density of Organic Phase | 0.905 | g/ml |
| Weight of Organic Phase | 1720.0 | g |
| Density of Aqueous Phase | 1.005 | g/ml |
| Weight of Aqueous Phase | 2100.0 | g |
| Polymerizable Monomers; DVB, EVB, and Styrene | 1720.0 | g |
| Total Volume of Organic and Aqueous Phases | 3990.0 | ml |
| Total Weight of Organic and Aqueous Phases | 3820.0 | g |

The aqueous phase composition for preparing the aromatic, crosslinked polymers of the present invention is set forth in Table 3 below:

TABLE 3

Aqueous Phase Composition For Preparing Aromatic, Crosslinked Polymers

| | |
|---|---|
| Ultrapure Water, wt. % | 98.700 |
| Dispersant[1] (Pure), wt. % | 0.500 |
| Sodium Carbonate[2], wt. % | 0.500 |
| Sodium Nitrite[2], wt. % | 0.300 |

[1]Dispersant may be any of those listed in Dispersant Table 5.
[2]Values are for anhydrous salts.

The aqueous phase charges for preparing aromatic, crosslinked polymers in a five (5) liter reactor is set forth in Table 4 below:

TABLE 4

Aqueous Phase Charges For Preparing Aromatic, Crosslinked Polymers in a Five (5) Liter Reactor

| | |
|---|---|
| Ultrapure Water, g | 2072.7 |
| Dispersant[1] (Pure), g | 10.5 |
| Sodium Carbonate[2], g | 10.5 |
| Sodium Nitrite[2], g | 6.3 |
| Total Weight Aqueous Phase, g | 2100.0 |

[1]Dispersant may be any of those listed in Dispersant Table 5.
[2]Values are for anhydrous salts.

The dispersants that can be used in the manufacturing of the polymers and that provide hemocompatibility to the polymeric bead surface are set forth in Table 5 below. In one embodiment, the dispersants provide the hemocompatible and/or biocompatible properties of the polymeric bead surfaces.

TABLE 5

| Dispersant List |
|---|
| Poly(N-vinylpyrrolidinone); BASF Luviskol K60 |
| Sodium Polyacrylate |
| Poly(hydroxyethyl acrylate) |
| Poly(hydroxypropyl acrylate) |
| Poly(hydroxyethyl methacrylate) |
| Poly(hydroxypropyl methacrylate) |
| Carrageenan; FMC Kappa and Lambda |
| Guar Gum Derivatives: Stein-Hall |
| Jaguar HP-11; Hydroxypropyl Guar Gum |
| Jaguar CMHP; Sodium Salt of Carboxymethyl, hydroxypropyl Guar Gum |

The organic phase composition for the aromatic, crosslinked gel polymer of the present invention is set forth in Table 6 below:

TABLE 6

Organic Phase Composition For an Aromatic, Crosslinked Gel Polymer

| | |
|---|---|
| Styrene, wt. % | 91.0 |
| Divinylbenzene (DVB), wt. % | 5.0 |
| Ethylvinylbenzene EVB, wt. % | 4.0 |
| Total Polymerizable Monomers, wt. % | 100.0 |
| Benzoyl Peroxide (Pure), wt. % of Polymerizable Monomers | 0.5 |

The organic phase charges for an aromatic, crosslinked gel polymer prepared in a five (5) liter reactor is set forth in Table 7 below:

TABLE 7

| Organic Phase Charges For an Aromatic, Crosslinked Gel Polymer Prepared in a Five (5) Liter Reactor | |
|---|---|
| Styrene, g | 1565.2 |
| Divinylbenzene (DVB), g Pure From Commercial 55% DVB of Composition 55 wt. % DVB, 44 wt. % EVB, and 1 wt. % Inerts | (86.0) |
| Ethylvinylbenzene (EVB), g | (68.8) |
| Commercial 55% DVB, g | 156.364 |
| Inerts, g | (1.564) |
| Weights in Parenthesis are Part of Commercial DVB | |
| Total Weight of Organic Phase Excluding BPO, g | 1721.564 |
| Benzoyl Peroxide, 75 wt. % active, g | 11.467 |

The dispersion mixture for a five (5) liter reactor for preparing aliphatic polymers of the present invention is set forth in Table 8 below:

TABLE 8

| Dispersion Mixture For Five (5) Liter Reactor For Preparing Aliphatic Polymers | | |
|---|---|---|
| Aq/Org. Vol. Ratio | 1.1 | |
| Volume of Organic Phase | 1900.0 | ml |
| Volume of Aqueous Phase | 2090.0 | ml |
| Density of organic Phase | 0.963194 | g/ml |
| Weight of Organic Phase | 1830.07 | g |
| Density of Aqueous Phase | 1.005 | g/ml |
| Weight of Aqueous Phase | 2153.95 | g |
| Polymerizable Monomers; Methyl Acrylate (MA) and Trimethylolpropane Trimethacrylate (TMPTMA) | 1830.07 | g |
| Total Volume of Organic & Aqueous Phases | 3990.0 | ml |
| Total Weight of Organic & Aqueous Phases | 3930.52 | g |

The aqueous phase composition for preparing the aliphatic, crosslinked gel polymers of the present invention is set forth in Table 9 below:

TABLE 9

| Aqueous Phase Composition For Preparing Aliphatic, Crosslinked Polymers | |
|---|---|
| Ultrapure Water, wt. % | 95.7 |
| Dispersant[1] (Pure), wt. % | 0.500 |
| Sodium Carbonate[2], wt. % | 0.500 |
| Sodium Nitrite[2], wt. % | 0.300 |
| Sodium Sulfate[2], wt. % | 3.0 |

[1]Dispersant may be anyone of those listed in Dispersant Table (Table 5).
[2]All the salts are computed on an anhydrous salt basis.

The aqueous phase charges for preparing aliphatic, crosslinked gel polymers of in a five (5) liter reactor is set forth in Table 10 below:

TABLE 10

| Aqueous Phase Charges For Preparing Aliphatic, Crosslinked Polymers in a Five (5) Liter Reactor | |
|---|---|
| Ultrapure Water | 2061.33 |
| Dispersant[1] (Pure), g | 10.77 |
| Sodium Carbonate[2], g | 10.77 |
| Sodium Nitrite[2], g | 6.46 |
| Sodium Sulfate[2], g | 64.62 |
| Total Weight Aqueous Phase, g | 2153.95 |

[1]Dispersant may be anyone of those listed in Dispersant Table (Table 5).
[2]All the salts are computed on an anhydrous salt basis.

The organic phase composition for an aliphatic, crosslinked gel polymer of the present invention is set forth in Table 11 below:

TABLE 11

| Organic Phase Composition For An Aliphatic, Crosslinked Gel Polymer | |
|---|---|
| Methyl Acrylate (MA), wt. % | 90.0 |
| Trimethylolpropane Trimethacrylate (TMPTMA) wt. % | 10.0 |
| Total Polymerizable Monomers, wt. % | 100.0 |
| Benzoyl Peroxide (Pure), wt. % of Polymerizable Monomers | 0.5 |

The organic phase charges for an aliphatic, crosslinked gel polymer of one of the embodiments of the polymers of the present invention is set forth in Table 12 below:

TABLE 12

| Organic Phase Charges For An Aliphatic, Crosslinked Gel Polymer Prepared in a Five (5) Liter Reactor | |
|---|---|
| Methyl Acrylate (MA) | 1647.1 g |
| Trimethylolpropane Trimethacrylate (TMPTMA) | 183.0 g |
| Total Weight of Organic Phase Excluding Benzoyl Peroxide (BPO) | 1830.1 g |
| Benzoyl Peroxide, 75 wt. % active, g | 12.2 g |

The phosphate selective polymers are then inserted into a cylindrical containment device with an inlet, an outlet and dimensions of holding at least 200 ml of the phosphate selective polymers in bead form. In another embodiment, the containment devices could have dimensions of at least 10 cms in diameter and at least 4 cms in length with the capacity to hold at least 300 mls of polymer bead bed volume. In still another embodiment, the containment devices could have dimensions of at least 10 cms in diameter and at least 10 cms in length with the capacity to hold at least 500 mls of polymer bead bed volume. The present invention can be used with any shaped containment device with a plurality of dimensions and any polymer bead bed volume capacity. For the purposes of this invention, the "polymer bead bed volume" is defined as the volume of a packed bed of beaded polymer.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. An apparatus containing crosslinked polymers for binding phosphate anions, said polymers comprising at least one polyvalent cation bound to said polymers and wherein said cation functions as the binding site for phosphate anions to thereby capture phosphate anions.

2. The apparatus of claim 1 wherein said polymers comprise monomer(s) selected from a group consisting of divinylbenzene, styrene, ethylvinylbenzene, acrylic acid, methacrylic acid, esters of acrylic acid, esters of methacrylic acid, maleic acid and esters thereof itaconic acid and esters thereof trimethylolpropane trimethacrylate, trimethylolpropane triacrylate, and mixtures thereof.

3. The apparatus of claim 1 wherein said cation is attached to each of said polymers through at least one anionic group, said anionic group is selected from a group consisting of sulfonate, carboxylate, phosphonate and mixtures thereof.

4. The apparatus of claim 1 wherein said cation is selected from a group consisting of aluminum, calcium, magnesium, molybdenum, manganese, titanium, barium, strontium, zirconium, vanadium, scandium, lanthanum, yttrium, cerium, nickel, iron, copper, cobalt, chromium, zinc and mixtures thereof.

5. The apparatus of claim 1 wherein said polymers are hemocompatible polymers.

6. The apparatus of claim 1 wherein said polymers are selected from a group consisting of biocompatible polymers, biocompatible porous polymers, biocompatible non-porous polymers and mixtures thereof.

7. The apparatus of claim 1 wherein said polymers bind to phosphate anions in a human bodily fluid environment and the human bodily fluid environment is selected from a group consisting of whole blood, lymph fluid, blood plasma and mixtures thereof.

8. The apparatus of claim 1 wherein said apparatus comprises a cartridge.

9. The apparatus of claim 1 wherein said apparatus has the capacity of holding at least 200 ml of said phosphate selective polymers.

10. The apparatus of claim 9 wherein said apparatus has the capacity of holding from about 200 ml to about 500 ml of said phosphate selective polymers.

11. The apparatus of claim 1 wherein said apparatus has an inlet, an outlet and a cylindrical geometry and a dimension of at least 10 cm in diameter and at least 4 cm in length with the capacity of holding at least 300 ml of polymer bead bed volume.

12. A containment device for housing crosslinked polymers for binding phosphate anions, each of said polymers comprising a polyvalent cation attached to each of said polymer through at least one covalently bound anionic functional group wherein said cation functions as the binding site for phosphate anions to thereby capture said phosphate anions.

13. The device of claim 12 wherein said polymers comprise monomer(s) selected from a group consisting of divinylbenzene, styrene, ethylvinylbenzene, acrylic acid, methacrylic acid, esters of acrylic acid, esters of methacrylic acid, maleic acid and esters thereof, itaconic acid and esters thereof, trimethylolpropane trimethacrylate, trimethylolpropane triacrylate, and mixtures thereof.

14. The device of claim 12 wherein said anionic functional group is selected from a group consisting of sulfonate, carboxylate, phosphonate and mixtures thereof.

15. The device of claim 12 wherein said cation is selected from a group consisting of aluminum, calcium, magnesium, molybdenum, manganese, titanium, barium, strontium, zirconium, vanadium, scandium, lanthanum, yttrium, cerium, nickel iron, copper, cobalt, chromium, zinc and mixtures thereof.

16. The device of claim 12 wherein said device has an inlet; an outlet; and a dimension of at least 10 cm in diameter and at least 10 cm in length with the capacity of holding at least 500 ml of polymer bead bed volume.

17. The device of claim 1 wherein said device has the capacity of holding at least 200 ml of said phosphate selective polymers.

18. A containment device for housing polymers for removing phosphate anions from a human bodily fluid environment, said polymer being manufactured by a method comprising: forming crosslinked polymers, attaching at least one anionic group to each of said polymers, and binding at least one polyvalent cation onto said anionic group attached to said polymer, wherein said cation functions as the binding site for phosphate anions to thereby capture said phosphate anions.

19. The device of claim 18 wherein said polymers comprise monomer(s) selected from a group consisting of divinylbenzene, styrene, ethylvinylbenzene, acrylic acid, methacrylic acid, esters of acrylic acid, esters of methacrylic acid, maleic acid and esters thereof, itaconic acid and esters thereof, trimethylolpropane trimethacrylate, trimethylolpropane triacrylate, and mixtures thereof, said anionic group is selected from a group consisting of sulfonate, carboxylate, phosphonate and mixtures thereof, and said cation is selected from a group consisting of aluminum, calcium, magnesium, molybdenum, manganese, titanium, barium, strontium, zirconium, vanadium, scandium, lanthanum, yttrium, cerium, nickel, iron, copper, cobalt, chromium, zinc and mixtures thereof.

20. The device of claim 18 further comprising the step of inserting said phosphate selective polymers into said device.

* * * * *